United States Patent
Yamanaka et al.

(10) Patent No.: US 9,809,236 B2
(45) Date of Patent: Nov. 7, 2017

(54) RAILROAD ELECTRIC POWER MANAGEMENT SYSTEM

(71) Applicant: Kabushiki Kaisha Toshiba, Minato-ku (JP)

(72) Inventors: Hideatsu Yamanaka, Yokohama (JP); Miyako Miyoshi, Ichikawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/912,791

(22) PCT Filed: Mar. 10, 2014

(86) PCT No.: PCT/JP2014/056210
§ 371 (c)(1),
(2) Date: Feb. 18, 2016

(87) PCT Pub. No.: WO2015/025546
PCT Pub. Date: Feb. 26, 2015

(65) Prior Publication Data
US 2016/0194016 A1   Jul. 7, 2016

(30) Foreign Application Priority Data

Aug. 21, 2013   (JP) ................................ 2013-171685

(51) Int. Cl.
*B61L 27/04* (2006.01)
*B61C 3/00* (2006.01)
(Continued)

(52) U.S. Cl.
CPC ............. *B61L 27/04* (2013.01); *B60M 3/00* (2013.01); *B61C 3/00* (2013.01); *B61L 3/006* (2013.01); *B61L 27/0027* (2013.01)

(58) Field of Classification Search
CPC ........ B60M 3/00; B61C 3/00; B61L 27/0027; B61L 27/04; B61L 3/006; B61L 27/0016;
(Continued)

(56) References Cited

U.S. PATENT DOCUMENTS 5,346,163 A * 9/1994 Momma ................. B60M 3/00
                                                    104/301
6,246,956 B1 * 6/2001 Miyoshi ................. B61L 23/16
                                                    246/182 R
(Continued)

FOREIGN PATENT DOCUMENTS

CN    102831478 A    12/2012
CN    102959358 A     3/2013
(Continued)

OTHER PUBLICATIONS

Combined Chinese Office Action and Search Report dated Sep. 6, 2016 in Patent Application No. 201480045898.2 (with English Translation and English Translation of Category of Cited Documents).

(Continued)

*Primary Examiner* — Dale Moyer
(74) *Attorney, Agent, or Firm* — Oblon, McClelland, Maier & Neustadt, L.L.P.

(57) ABSTRACT

A railroad electric power management system includes a service management system, a station management system and a control system. The service management system performs service management of railroad vehicles. The station management system performs operation management of a station facility. The control system controls the service management system and the station management system such that a sum of first electric power consumption and second electric power consumption is to be equal to or less than a certain electric-power regulation value. the first electric power consumption is consumed by the railroad vehicles. The second electric power consumption is consumed by the station facility.

4 Claims, 7 Drawing Sheets

(51) Int. Cl.
*B60M 3/00* (2006.01)
*B61L 3/00* (2006.01)
*B61L 27/00* (2006.01)

(58) Field of Classification Search
CPC .............. B61L 27/002; G01C 21/3469; B60L 2200/26; B60L 15/2045; B60L 15/20
See application file for complete search history.

(56) References Cited

U.S. PATENT DOCUMENTS

| | | | |
|---|---|---|---|
| 2003/0230994 A1* | 12/2003 | Seddiki | B60L 9/00 318/432 |
| 2013/0131892 A1 | 5/2013 | Hashimoto et al. | |
| 2014/0316599 A1* | 10/2014 | Tomita | H04L 12/2823 700/295 |

FOREIGN PATENT DOCUMENTS

| | | |
|---|---|---|
| DE | 196 54 960 A1 | 7/1998 |
| EP | 1 359 049 A1 | 11/2003 |
| JP | 5-16808 A | 1/1993 |
| JP | 10-322905 A | 12/1998 |
| JP | 2000-198444 A | 7/2000 |
| JP | 2013-132980 A | 7/2013 |
| WO | WO 2013/080308 A1 | 6/2013 |

OTHER PUBLICATIONS

International Search Report dated Jun. 10, 2014 in PCT/JP2014/056210.

* cited by examiner

BEFORE ALLEVIATION

| TIME ZONE | A STATION (FIRST PRIORITY) | | | B STATION (SECOND PRIORITY) | | | C STATION (THIRD PRIORITY) | | | TOTAL STATION ELECTRIC POWER | TOTAL FEEDING ELECTRIC POWER | TOTAL ELECTRIC POWER | ELECTRIC POWER CONTROL VALUE | MARGIN VALUE |
|---|---|---|---|---|---|---|---|---|---|---|---|---|---|---|
| | OPERATION PATTERN P11 | OPERATION PATTERN P12 | OPERATION PATTERN P13 | OPERATION PATTERN P21 | OPERATION PATTERN P22 | OPERATION PATTERN P23 | OPERATION PATTERN P31 | OPERATION PATTERN P32 | OPERATION PATTERN P33 | | | | | |
| 7:00 TO 8:00 | 3 | 3 | 2 | 3 | 3 | 2 | 3 | 3 | 2 | 6 | 74 | 80 | 80 | 0 |
| 8:00 TO 9:00 | 4 | 3 | 3 | 3 | 3 | 2 | 3 | 3 | 2 | 7 | 102 | 109 | 110 | 1 |
| 9:00 TO 10:00 | 4 | 3 | 3 | 3 | 3 | 2 | 3 | 3 | 3 | 8 | 90 | 98 | 100 | 2 |
| 10:00 TO 11:00 | 4 | 3 | 3 | 4 | 3 | 2 | 4 | 3 | 3 | 9 | 80 | 89 | 90 | 1 |
| 11:00 TO 12:00 | 4 | 4 | 3 | 4 | 3 | 3 | 4 | 3 | 3 | 9 | 71 | 80 | 80 | 0 |
| 12:00 TO 13:00 | 5 | 4 | 3 | 4 | 3 | 3 | 4 | 3 | 3 | 9 | 61 | 70 | 70 | 0 |
| 13:00 TO 14:00 | 5 | 4 | 3 | 4 | 3 | 3 | 4 | 3 | 3 | 9 | 58 | 67 | 70 | 3 |
| 14:00 TO 15:00 | 5 | 4 | 3 | 4 | 3 | 3 | 4 | 3 | 3 | 9 | 59 | 68 | 70 | 2 |
| 15:00 TO 16:00 | 4 | 3 | 3 | 3 | 3 | 2 | 3 | 3 | 2 | 8 | 62 | 70 | 70 | 0 |
| 16:00 TO 17:00 | 4 | 3 | 3 | 3 | 3 | 2 | 3 | 3 | 2 | 7 | 73 | 80 | 80 | 0 |
| 17:00 TO 18:00 | 4 | 3 | 3 | 3 | 3 | 2 | 3 | 3 | 2 | 7 | 73 | 80 | 80 | 0 |
| 18:00 TO 19:00 | 4 | 3 | 3 | 3 | 3 | 2 | 3 | 3 | 2 | 7 | 73 | 80 | 80 | 0 |
| 19:00 TO 20:00 | 4 | 3 | 3 | 3 | 3 | 2 | 3 | 3 | 2 | 7 | 63 | 70 | 70 | 0 |
| 20:00 TO 21:00 | 4 | 3 | 3 | 3 | 3 | 2 | 3 | 2 | 2 | 7 | 63 | 70 | 70 | 0 |
| 21:00 TO 22:00 | 3 | 3 | 2 | 2 | 3 | 1 | 3 | 2 | 2 | 5 | 50 | 55 | 55 | 0 |
| 22:00 TO 23:00 | 3 | 3 | 2 | 2 | 3 | 1 | 3 | 2 | 2 | 5 | 40 | 45 | 45 | 0 |

FIG.6

AFTER ALLEVIATION

| TIME ZONE | A STATION (FIRST PRIORITY) | | B STATION (SECOND PRIORITY) | | | C STATION (THIRD PRIORITY) | | | TOTAL STATION ELECTRIC POWER | TOTAL FEEDING ELECTRIC POWER | TOTAL ELECTRIC POWER | ELECTRIC POWER CONTROL VALUE | MARGIN VALUE |
|---|---|---|---|---|---|---|---|---|---|---|---|---|---|
| | OPERATION PATTERN P11 | OPERATION PATTERN P12 | OPERATION PATTERN P13 | OPERATION PATTERN P21 | OPERATION PATTERN P22 | OPERATION PATTERN P23 | OPERATION PATTERN P31 | OPERATION PATTERN P32 | OPERATION PATTERN P33 | | | | | |
| 7:00 TO 8:00 | 3 | 3 | 2 | 3 | 3 | 2 | 3 | 3 | 2 | 6 | 74 | 80 | 80 | 0 |
| 8:00 TO 9:00 | 4 | 3 | 3 | 3 | 3 | 2 | 3 | 3 | 2 | 8 | 102 | 110 | 110 | 0 |
| 9:00 TO 10:00 | 4 | 3 | 3 | 3 | 3 | 2 | 3 | 3 | 3 | 10 | 90 | 100 | 100 | 0 |
| 10:00 TO 11:00 | 4 | 3 | 3 | 4 | 3 | 3 | 4 | 3 | 3 | 10 | 80 | 90 | 90 | 0 |
| 11:00 TO 12:00 | 4 | 3 | 3 | 4 | 3 | 3 | 4 | 3 | 3 | 9 | 71 | 80 | 80 | 0 |
| 12:00 TO 13:00 | 5 | 4 | 3 | 4 | 3 | 3 | 4 | 3 | 3 | 9 | 61 | 70 | 70 | 0 |
| 13:00 TO 14:00 | 5 | 4 | 3 | 3 | 3 | 2 | 4 | 3 | 3 | 12 | 58 | 70 | 70 | 0 |
| 14:00 TO 15:00 | 5 | 4 | 3 | 3 | 3 | 2 | 4 | 3 | 3 | 11 | 59 | 70 | 70 | 0 |
| 15:00 TO 16:00 | 4 | 3 | 3 | 3 | 3 | 2 | 3 | 3 | 2 | 8 | 62 | 70 | 70 | 0 |
| 16:00 TO 17:00 | 4 | 3 | 3 | 3 | 3 | 2 | 3 | 3 | 2 | 7 | 73 | 80 | 80 | 0 |
| 17:00 TO 18:00 | 4 | 3 | 3 | 3 | 3 | 2 | 3 | 3 | 2 | 7 | 73 | 80 | 80 | 0 |
| 18:00 TO 19:00 | 4 | 3 | 3 | 3 | 3 | 2 | 3 | 3 | 2 | 7 | 73 | 80 | 80 | 0 |
| 19:00 TO 20:00 | 4 | 3 | 3 | 3 | 3 | 2 | 3 | 3 | 2 | 7 | 73 | 80 | 80 | 0 |
| 20:00 TO 21:00 | 4 | 3 | 3 | 2 | 3 | 2 | 3 | 2 | 2 | 7 | 63 | 70 | 70 | 0 |
| 21:00 TO 22:00 | 3 | 3 | 2 | 2 | 3 | 1 | 3 | 2 | 2 | 5 | 50 | 55 | 55 | 0 |
| 22:00 TO 23:00 | 3 | 3 | 2 | 2 | 3 | 1 | 3 | 2 | 2 | 5 | 40 | 45 | 45 | 0 |

RAILROAD ELECTRIC POWER MANAGEMENT SYSTEM

CROSS-REFERENCE TO RELATED APPLICATIONS

This application is national stage application of International Application No. PCT/JP2014/056210, filed Mar. 10, 2014, which designates the United States, incorporated herein by reference, and which claims the benefit of priority from Japanese Patent Application No. 2013-171685, filed Aug. 21, 2013, the entire contents of which are incorporated herein by reference.

FIELD

Embodiments described herein relate generally to a railroad electric power management system.

BACKGROUND

A technology has been conventionally known that reduces the amount of energy consumption of a service side by altering a service timetable so as not to exceed a certain amount of electric power that is under contract with an electric power company. In such a technology, for the purpose of energy saving of a whole of a railroad system including station facilities, the energy saving of a station side may also be performed, in addition to the energy saving on the service side. In this case, it is common that the energy saving on the service side and the energy saving on the station side are performed independently from each other.

In such a technology described above, for an example, it is desirable that the energy saving on the service side and the energy saving on the station side be able to be performed in a unified manner.

DETAILED DESCRIPTION

The following describes an exemplary embodiment based on the accompanying drawings.

In general, according to an embodiment, a railroad electric power management system comprises a service management system, a station management system and a control system. The service management system performs service management of railroad vehicles. The station management system performs operation management of a station facility. The control system controls the service management system and the station management system such that a sum of first electric power consumption and second electric power consumption is to be equal to or less than a certain electric-power regulation value. the first electric power consumption is consumed by the railroad vehicles. The second electric power consumption is consumed by the station facility.

First, with reference to FIGS. 1 to 6, one example of a railroad electric power management system 100 according to the present embodiment will be described. Note that the railroad is a broader concept including a transportation system such as light rail, transit (LRT).

Figure 1:
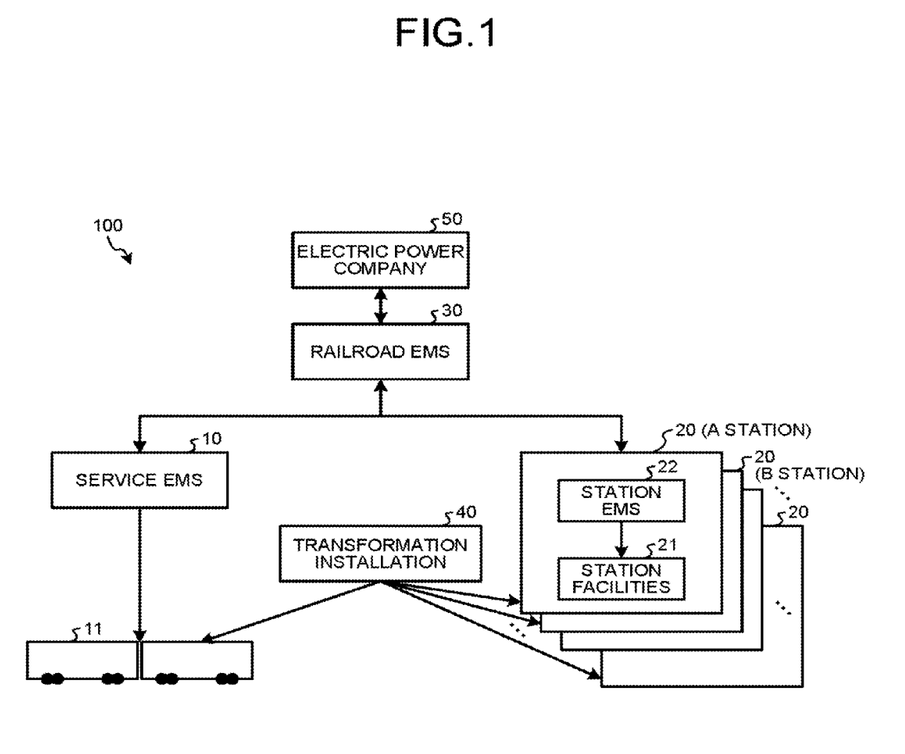
FIG. 1 is a diagram illustrating one example of an overall configuration of a railroad electric power management system according to an embodiment.

As illustrated in FIG. 1, the railroad electric power management system 100 includes a service energy management system (EMS) 10, station systems 20, and a railroad EMS 30. The service EMS 10 and the railroad EMS 30 are examples of "service management system" and "control system," respectively.

The service EMS 10 is configured to perform service management of railroad vehicles 11. Specifically, the service EMS 10 is configured to be able to control electric power consumed by the railroad vehicles 11 (first electric power consumption) by performing the control on a service timetable of the railroad vehicles 11 (such as partial service and shuttle service). The railroad vehicles 11 are configured to perform service based on the electric power (feeding electric power) supplied from a transformation installation 40.

A plurality of station systems 20 are provided to correspond to a plurality of stations (in FIG. 1, A station, B station, and others). These station systems 20 each include station facilities 21 and a station EMS 22. The station EMS 22 is one example of "station management system."

The station EMS 22 is configured to perform operation management of the station facilities 21. Specifically, the station EMS 22 is configured to be able to control electric power consumed by the station facilities 21 (second electric power consumption) by performing thinning of lighting included in the station facilities 21 and temperature adjustment of air conditioning. The station facilities 21 are configured to be operated based on the electric power supplied from the transformation installation 40.

In the present embodiment, the railroad EMS 30 is configured to control the service EMS 10 and the station EMS 22 such that the sum of the first electric power consumption consumed by the railroad vehicles 11 and the second electric power consumption consumed by the station facilities 21 will be equal to or less than a certain electric-power regulation value. The electric-power regulation value is a value that is input to the railroad EMS 30 from an electric power company 50 and is the one for controlling the amount of energy consumption of the entire system including the service side and the station side.

In the present embodiment, the service EMS 10 and the station EMS 22 are configured to be able to calculate an estimate value of the first electric power consumption and that of the second electric power consumption, respectively. The railroad EMS 30 is configured to compare the sum of these estimate values of the first electric power consumption and the second electric power consumption with the electric-power regulation value and control the service EMS 10 and the station EMS 22 such that the sum of the estimate values will be equal to or less than the electric-power regulation value.

Figure 2:
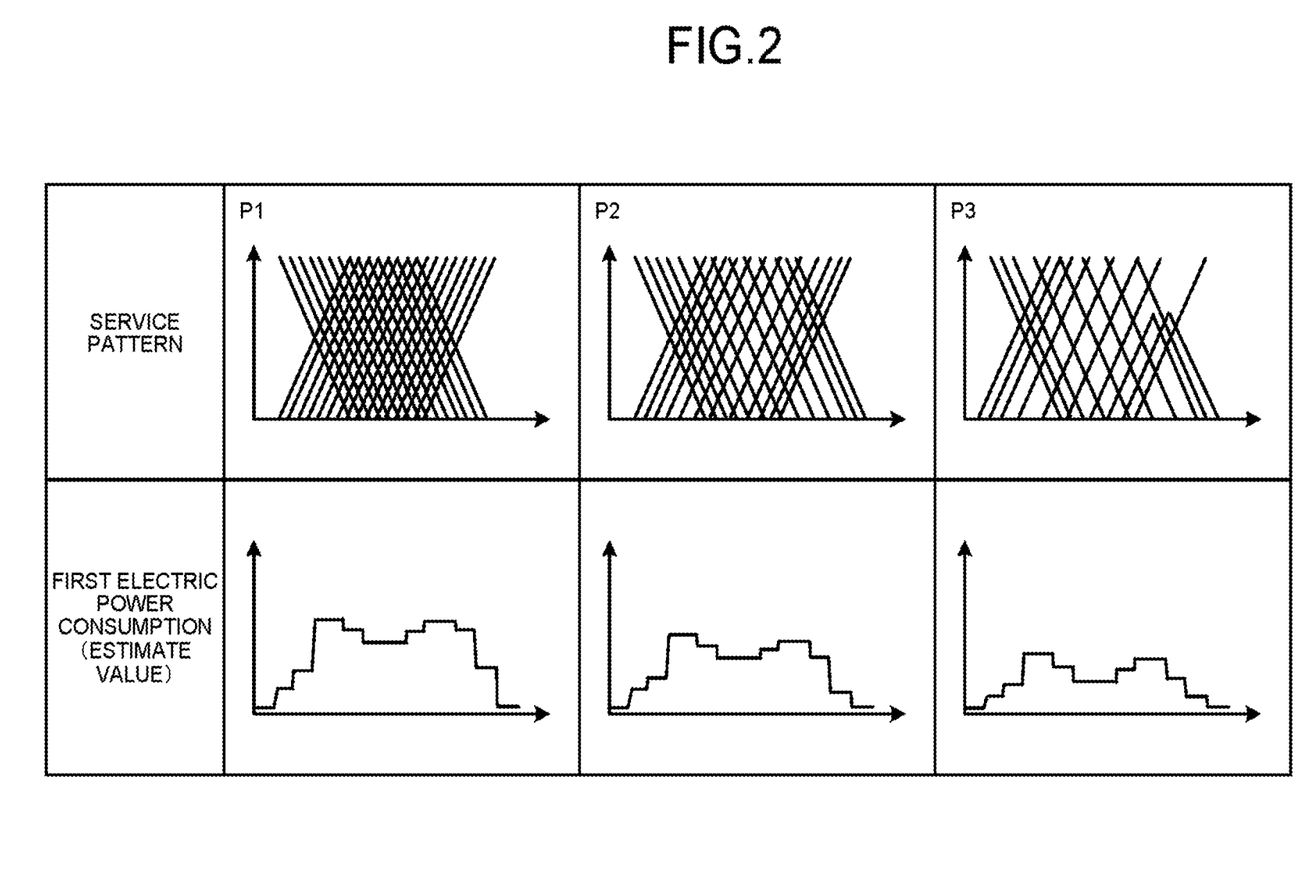
FIG. 2 is a diagram illustrating one example of the relation between a service pattern in a service energy management system (EMS) and an estimate value of electric power consumption in the embodiment.

More specifically, the service EMS 10 is configured to be able to achieve power saving of the first electric power consumption by switching a plurality of service patterns (see FIG. 2) concerning the service timetable of the railroad vehicles 11. In FIG. 2, displayed in charts are three service patterns P1, P2, and P3 and the respective estimate values of electric power consumption (the first electric power consumption) corresponding to these three service patterns P1 to P3.

The service pattern P1 is a normal service pattern with no partial service and no shuttle service. The service pattern P2 is a service pattern in which partial service is partially performed on the service pattern P1. The service pattern P3 is a service pattern in which partial service and shuttle service are further performed on the service pattern P2. As illustrated in FIG. 2, the estimate values of electric power consumption (the first electric power consumption) corresponding to the respective service patterns gradually become smaller in order of the service patterns P1, P2, and P3. The embodiment may be configured such that all of these service patterns P1 to P3 are defined in advance in the service EMS 10, and may be configured such that only the service pattern P1 and the service pattern P2 are defined in advance in the service EMS 10 and a new service pattern P3 is generated by making an adjustment in real time in the service pattern P2 that has been defined in advance.

Figure 3:
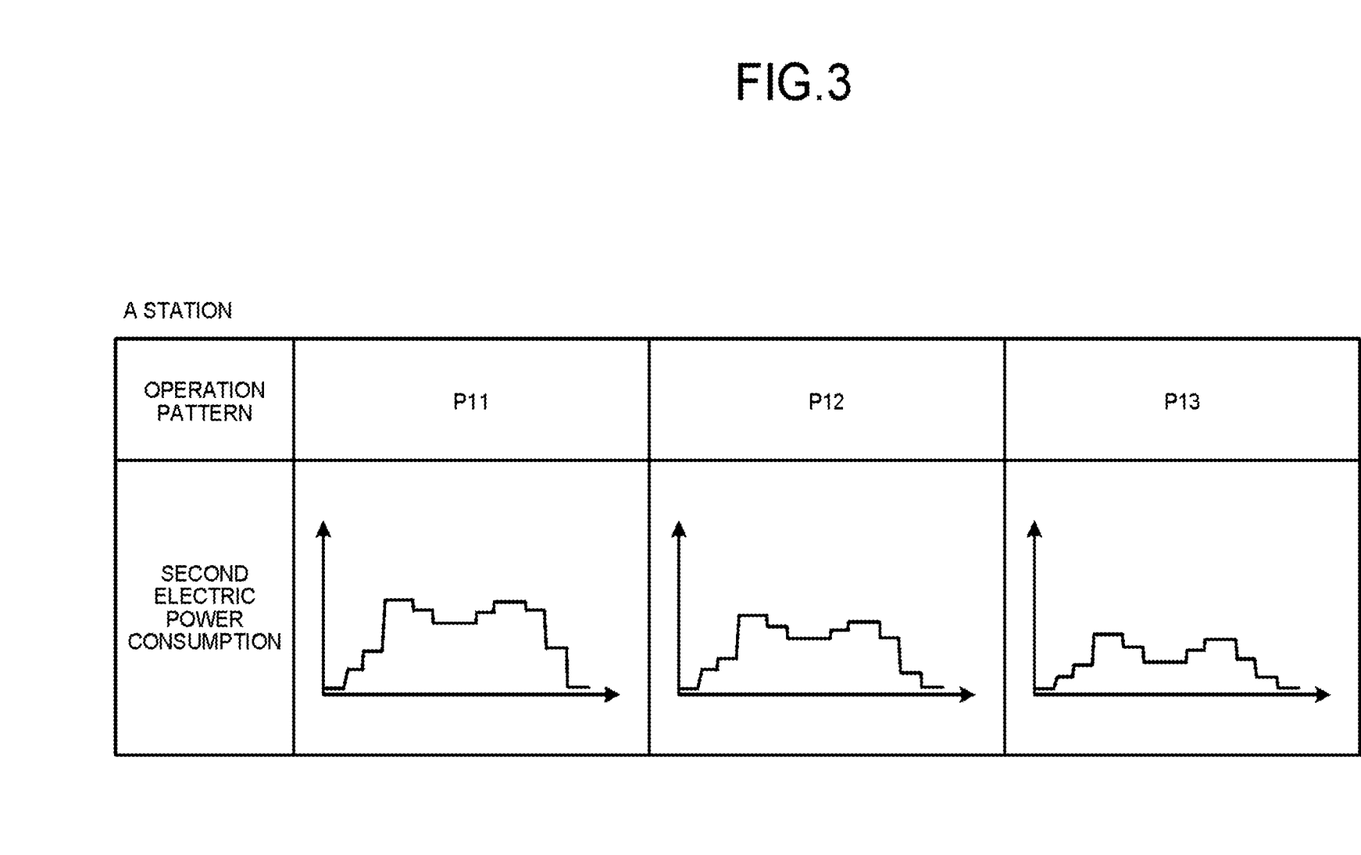
FIG. 3 is a diagram illustrating one example of the relation between an operation pattern in a station EMS (A station) and an estimate value of electric power consumption in the embodiment.
Figure 4:
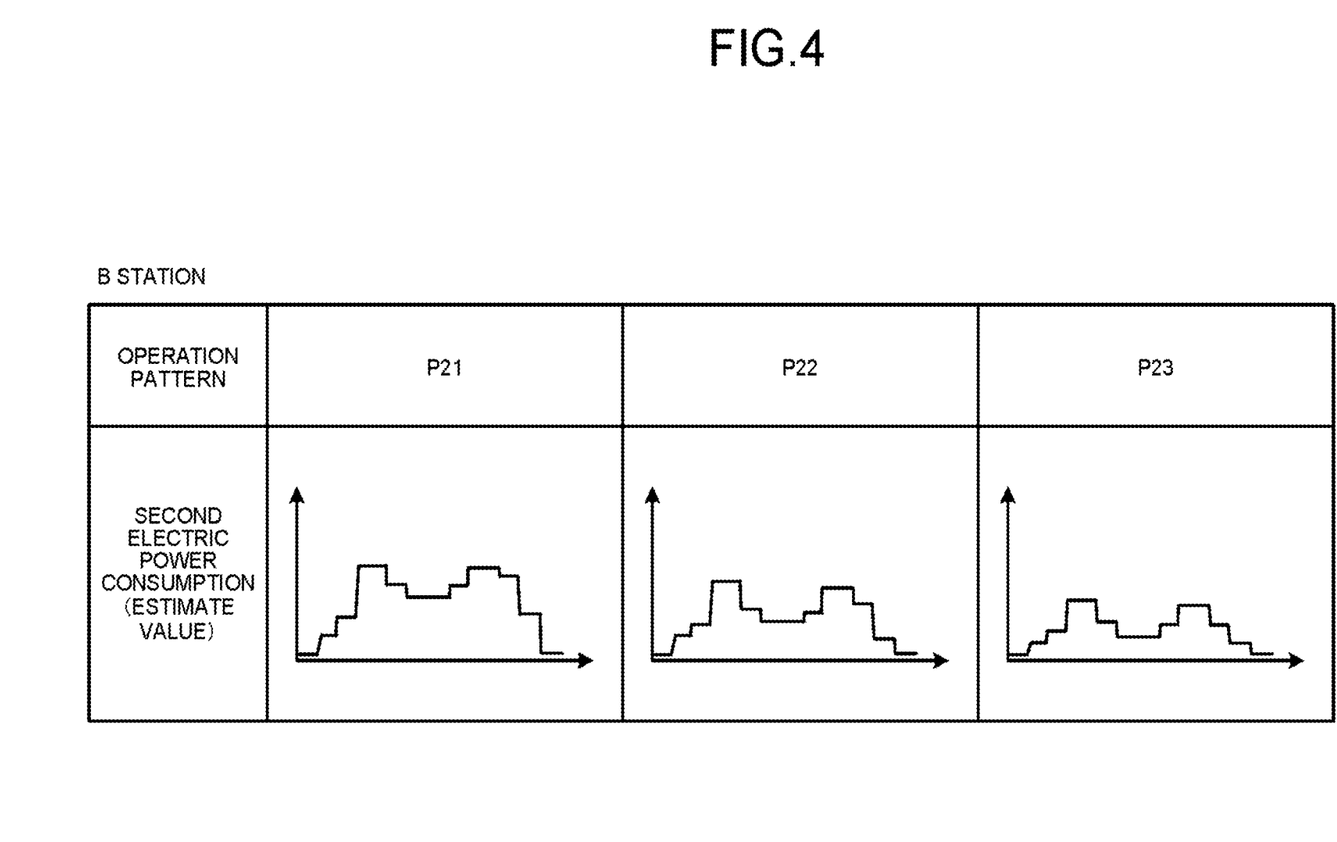
FIG. 4 is a diagram illustrating one example of the relation between an operation pattern in a station EMS (B station) and an estimate value of electric power consumption in the embodiment.

Furthermore, as with the above-described service EMS 10, the station EMS 22 is configured to be able to achieve power saving of the second electric power consumption by switching a plurality of operation patterns (see FIGS. 3 and 4) concerning the operation of the station facilities 21. In FIG. 3, for an example, displayed in charts are three operation patterns P11, P12, and P13 of the station facilities 21 corresponding to the A station and the respective estimate values of electric power consumption (the second electric power consumption) corresponding to these operation patterns P11 to P13. In FIG. 4, for an example, displayed in charts are three operation patterns P21, P22, and P23 of the station facilities 21 corresponding to the B station and the respective estimate values of electric power consumption (the second electric power consumption) corresponding to these three operation patterns P21 to P23. As illustrated in FIG. 3 (FIG. 4), the estimate values of electric power consumption (the second electric power consumption) corresponding to the respective operation patterns gradually become smaller in order of the operation patterns P11, P12, and P13 (P21, P22, and P23). As with the above-described service patterns P1 to P3, the present embodiment may be configured such that all of the operation patterns P11 to P13 (P21 to P23) are defined in advance in the station EMS 22. The embodiment may be configured such that the operation patterns P11 to P13 (P21 to P23) defined in advance are adjusted in real time based on the latest timetable information (service pattern) acquired from the service EMS 10, a sunshine forecast, and others.

In the present embodiment, the railroad EMS 30 is configured to determine, out of a plurality of above-described service patterns and operation patterns, the service pattern and the operation patterns with which the sum of the estimate values of the first electric power consumption and the second electric power consumption will foe equal to or less than the electric-power regulation value, and operate the service EMS 10 and the station EMSs 22 with the determined service pattern and operation patterns, respectively.

More specifically, the railroad EMS 30 is configured to first select, in a state in which the operation patterns of the least second electric power consumption (for example, the operation patterns P13 and P23 in FIGS. 3 and 4, respectively) have been selected out of a plurality of operation patterns, a plurality of service patterns in sequence in descending order of the first electric power consumption and compare the electric-power regulation value with the sum of the estimate values corresponding to the selected service patterns and operation patterns (the sum of the electric power consumption of the entire system including the service side and the station side). Here, the railroad EMS 30 is configured to determine, based on these comparison results, the service patterns and operation patterns, which have been selected at the time the sum of the estimate values became equal to or less than the electric-power regulation value, to be the service patterns and operation patterns to operate the service EMS 10 and the station EMSs 22.

When a plurality of service patterns are selected in sequence in descending order of the first electric power consumption as in the foregoing, there may be a case in which the first electric power consumption corresponding to the selected service pattern is smaller than an electric power value necessary to provide minimum service. Thus, in the present embodiment, the railroad EMS 30 is configured to determine whether the first electric power consumption is equal to or greater than the electric power value necessary to provide the minimum service when the service patterns are selected in sequence and, in the case the first electric power consumption becomes smaller than the electric power value necessary to provide the minimum service, notify the electric power company 50 that it is difficult to accept the electric-power regulation value. Consequently, in the present embodiment, for an example, it can be changed to a higher rate plan, and thus it is possible to provide the railroad electric power management system 100 dealing with a demand response that does not impair the stability of a power network and the convenience of users of the railroad vehicles 11 and the station facilities 21. The electric power value necessary to provide the minimum service may be the one that a company inputs as appropriate and may be the one like a threshold defined in advance.

Furthermore, in the present embodiment, the railroad EMS 30 is configured to switch the operation pattern to the one that is of greater second electric power consumption in a range for which the sum of the estimate values is equal to or less than the electric-power regulation value when the sum of the estimate values corresponding to the service patterns and operation patterns that have been determined as in the foregoing is smaller than the electric-power regulation value by a certain value or more. That is, the railroad EMS 30 is configured to compare the electric-power regulation value with the estimate value of the electric power consumption of the entire system corresponding to the determined service patterns and operation patterns (the sum of the estimate value of the first electric power consumption on the service side and the estimate value of the second electric power consumption on the station side) after having determined the service patterns and operation patterns and determine whether a margin value is present with respect to the electric-power regulation value. The railroad EMS 30 is configured to switch (alleviate) the operation pattern to the one that is of greater electric power consumption (the second electric power consumption) when it is determined that the margin value with respect to the electric-power regulation value is present. At this time, the railroad EMS 30 is configured to alleviate the operation patterns in sequence from the station facilities 21 of higher priority (for example, the station facilities in a station with many users) out of a plurality of station facilities 21.

Figure 5:
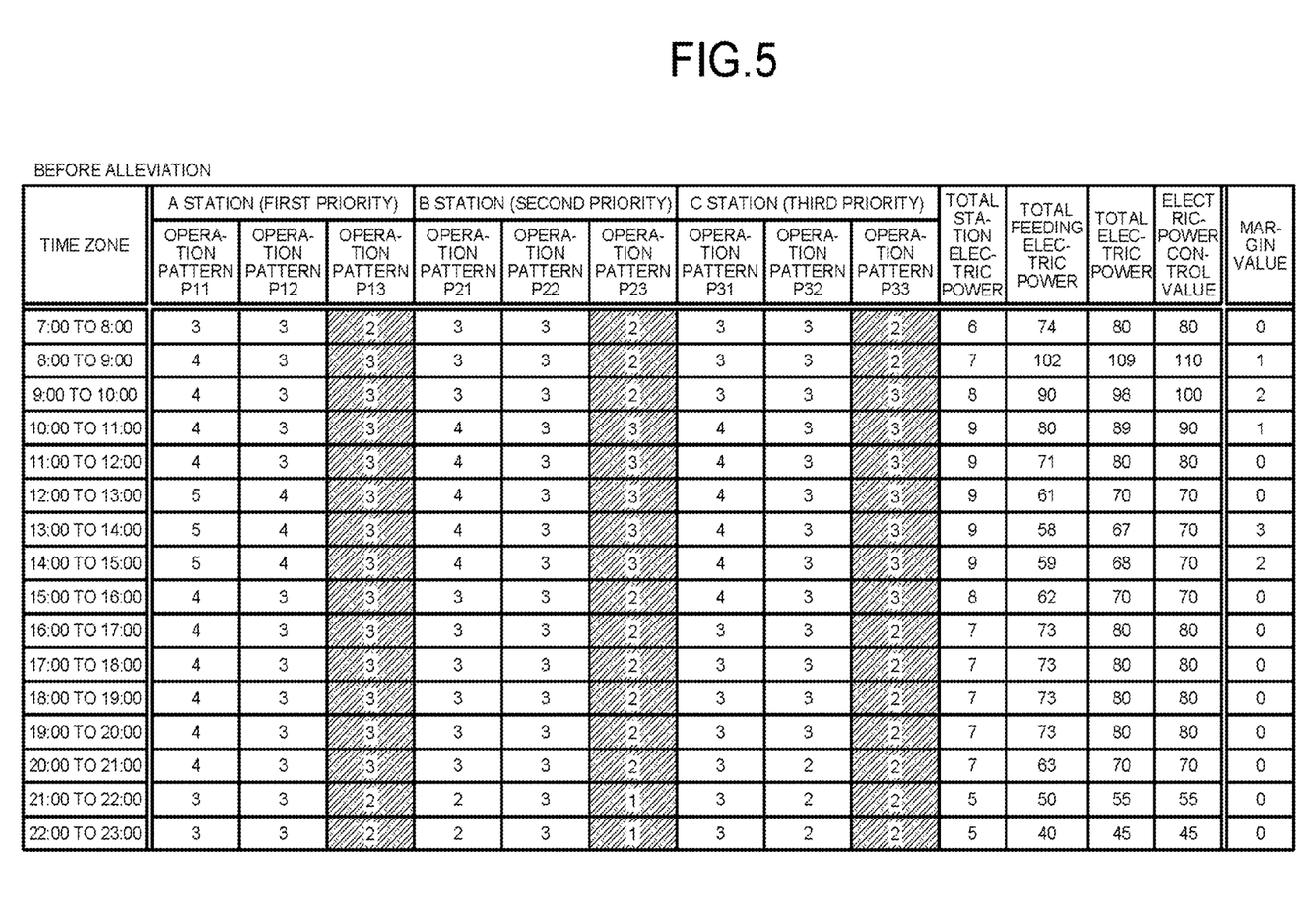
FIG. 5 is a diagram illustrating one example of the relation between an electric-power regulation value, and an estimate value of electric power consumption before alleviation of operation patterns in station EMSs in accordance with priority in the embodiment.
Figure 6:
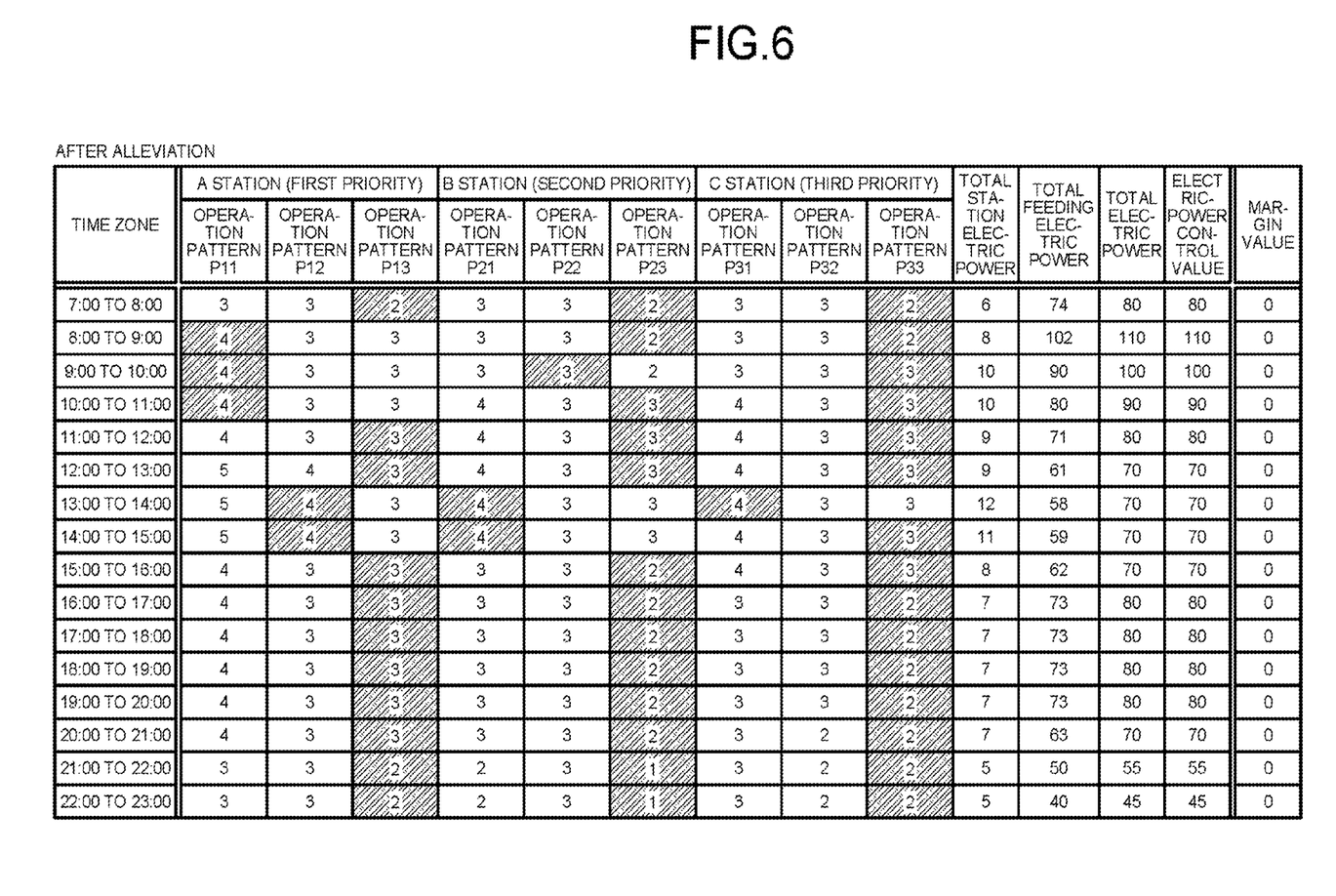
FIG. 6 is a diagram illustrating one example of the relation between an electric-power regulation value, and an estimate value of electric power consumption after alleviation of the operation patterns in the station EMSs in accordance with priority in the embodiment.

With reference to FIGS. 5 and 6, the alleviation of operation patterns as in the foregoing will be described more specifically. Note that the numerical values illustrated in FIGS. 5 and 6 are merely examples, and are not limited to these.

FIG. 5 is a table in which each electric power consumption (estimate value) before alleviation of the operation pattern is listed by time zones. In FIG. 5, listed by time zones are the estimate values of the second electric power consumption corresponding to a plurality of operation patterns including three operation patterns each (patterns P11 to P13, P21 to P23, and P31 to P33) for three station EMSs 22 (A station, B station, and C station); the sum of the estimate values of the second electric power consumption (total station electric power); the estimate value of the first electric power consumption corresponding to the present service pattern (total feeding electric power); the sum of the total station electric power and the total feeding electric power (total electric power); the electric-power regulation value; and the margin value with respect to the electric-power regulation value (difference between the electric-power regulation value and the total electric power). The hatching of diagonal lines in FIG. 5 indicates operation patterns before the alleviation. That is, as illustrated in FIG. 5, before the operation patterns are alleviated, the operation patterns P13, P23, and P33 of the least electric power consumption are selected at all time zones of all of the A station, the B station, and the C station. The margin values of greater than one are present at five time zones (8:00 to 9:00, 9:00 to 10:00, 10:00 to 11:00, 13:00 to 14:00, and 14:00 to 15:00).

Meanwhile, FIG. 6 is a table in which each electric power consumption (estimate value) after alleviation of the operation patterns selected in FIG. 5 in accordance with the priority defined to the respective stations (A station: the first priority, B station: the second priority, C station: the third priority) is listed by time zones. As illustrated in FIG. 6, at the time zone of 8:00 to 3:00 in which the margin value of "1" was present in FIG. 5, the operation pattern of the A station has been alleviated to P11 from P13. Because this operation pattern P11 is greater in electric power consumption (estimate value) than the operation pattern P13 by "1," the margin value of "1" becomes smaller to that extent and becomes "0." In the same manner, at the time zone of 9:00 to 10:00, the operation pattern of the A station, which is of the first priority, is alleviated to P11 from P13 and the operation pattern of the B station, which is of the second priority, is alleviated to P22 from P23, whereby the margin value "2" that was present in FIG. 5 has become "0."

Furthermore, at the time zone of 10:00 to 11:00, the operation pattern of the A station, which is of the first priority, is alleviated to P11 from P13, whereby the margin value "1" that was present in FIG. 5 has become "0." At the time zone of 13:00 to 14:00, the operation pattern of the A station, which is of the first priority, is alleviated to P12 from P13, the operation pattern of the B station, which is of the second priority, is alleviated to P21 from P23, and the operation pattern of the C station, which is of the third priority, is alleviated to P31 from P33, whereby the margin value "3" that was present in FIG. 5 has become "0." At the time zone of 14:00 to 15:00, the operation pattern of the A station, which is of the first priority, is alleviated to P12 from P13 and the operation pattern of the B station, which is of the second priority, is alleviated to P21 from P23, whereby the margin value "2" that was present in FIG. 5 has become "0."

Next, with reference to FIG. 7, one example of a sequence of processing performed by the railroad EMS 30 of the railroad electric power management system 100 in the present embodiment will be described.

Figure 7:
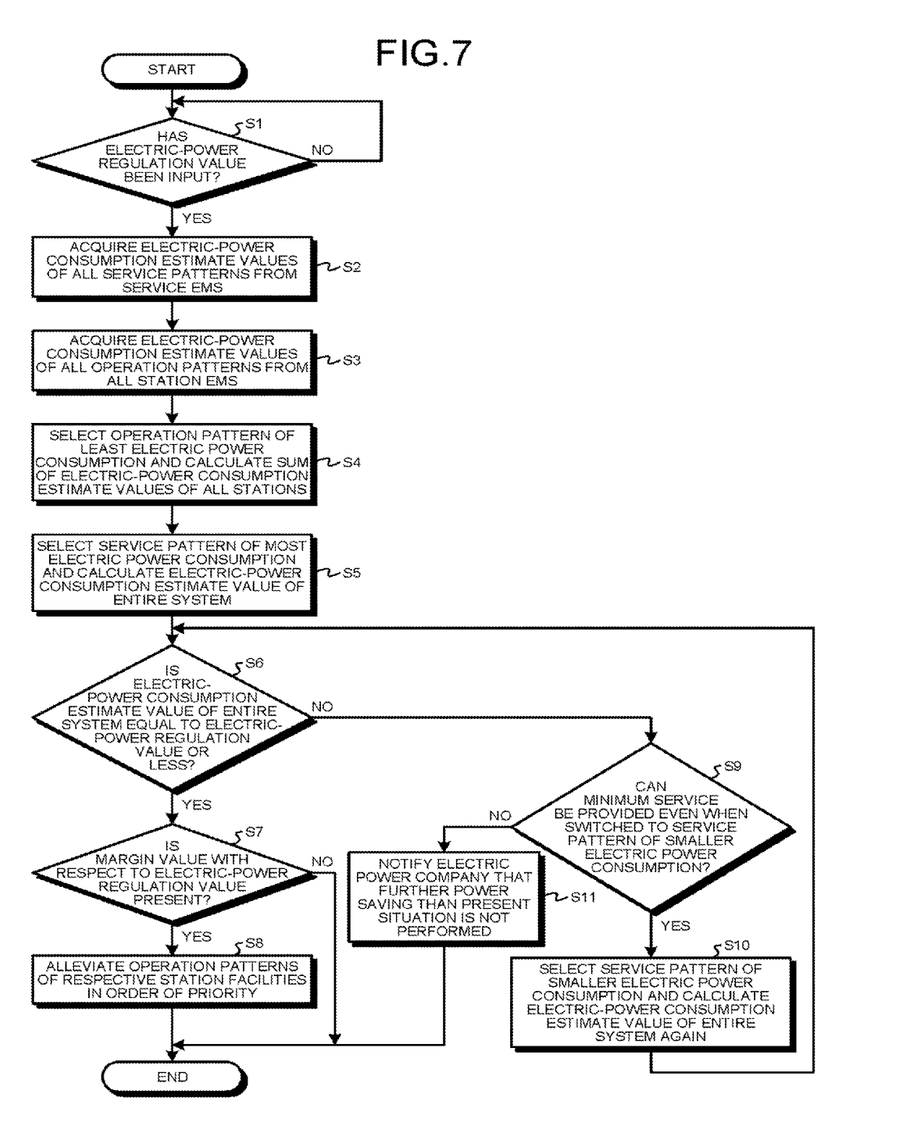
FIG. 7 is a flowchart illustrating one example of a sequence of processing performed by a railroad EMS in the embodiment.

In this sequence of processing, as illustrated in FIG. 7, at Step S1, the processing of determining whether an electric-power regulation value has been input from the electric power company 50 is performed first. The processing of this Step S1 is repeated until it is determined that the electric-power regulation value has been input. At Step S1, when it is determined that the electric-power regulation value has been input, the sequence is advanced to Step S2.

Next, at Step S2, the processing of acquiring, from the service EMS 10, the electric-power consumption estimate values (the estimate values of the first electric power consumption) corresponding to all of a plurality of service patterns defined in advance in the service EMS 10 is performed, and the sequence is advanced to Step S3.

Next, at Step S3, the processing of acquiring, from all of a plurality of station EMSs 22, the electric-power consumption estimate values (the estimate values of the second electric power consumption) corresponding to all of a plurality of operation patterns defined in advance in the station EMSs 22 is performed, and the sequence is advanced to Step S4.

Next, at Step S4, the processing of selecting, out of the above-described operation patterns defined in advance, the operation pattern of the least electric power consumption (the second electric power consumption) (the operation pattern P13 of the A station, the operation pattern P23 of the B station, and the operation pattern P33 of the C station in the examples illustrated in FIGS. 3 to 5) for each of the station EMSs 22, and calculating the sum of the estimate values of the second electric power consumption corresponding to the respective operation patterns is performed. The sequence is then advanced to Step S5.

Next, at Step S5, the processing of selecting, out of the above-described service patterns defined in advance, the service pattern of the most electric power consumption (the first electric power consumption) (the service pattern P1 in the example illustrated in FIG. 2), and calculating the estimate value of the electric power consumption of the entire system including the service side and the station side is performed. Specifically, the estimate value of the first electric power consumption corresponding to the service pattern selected at this Step S5 is added to the sum of the estimate values of the second electric power consumption calculated by the processing at the foregoing Step S4, whereby the estimate value of the electric power consumption of the entire system is calculated. The sequence is then advanced to Step S6.

Next, at Step S6, the processing of determining whether the estimate value of the entire system calculated at the above-described Step S5 (or Step S10, which will be described later) is equal to or less than the electric-power regulation value input at the above-described Step S1 is performed.

At the above-described Step S6, when it is determined that the estimate value of the electric power consumption of the entire system is equal to or less than the electric-power regulation value, the sequence is advanced to Step S7. At Step S7, the processing of determining whether a margin value with respect to the electric-power regulation value is present (whether the estimate value of the electric power consumption of the entire system is smaller than the electric-power regulation value by a certain value or more) is performed. At this Step S7, when it is determined that a margin value with respect to the electric-power regulation value is present, the sequence is advanced to Step S8. At Step S8, the processing of alleviating the operation patterns of the respective station facilities 21 in order of priority (see FIGS. 5 and 6) is performed, and the processing is finished. When it is determined that a margin value with respect to the electric-power regulation value is not present at Step S7, the processing is finished as is without the processing as in Step S8.

Meanwhile, at the above-described Step S6, when it is determined that the estimate value of the electric power consumption of the entire system is greater than the electric-power regulation value, the sequence is advanced to Step S9. At Step S9, the processing of determining whether it is possible to provide the minimum service even when the service pattern of the railroad vehicles 11 is switched to the one that is of smaller electric power consumption is performed. Specifically, when the present service pattern is switched to the one that is of smaller electric power consumption, performed is the processing of determining whether the electric power consumption corresponding to the service pattern after the switching is equal to or greater than the electric power value necessary to provide the minimum service.

At the above-described Step S9, when it is determined that it is possible to provide the minimum service even when the service pattern is switched, the sequence is advanced to Step S10. At Step S10, the processing of switching the present service pattern to the one that is of smaller electric power consumption, and calculating again the estimate value of the electric power consumption of the entire system (the sum of the estimate value of the first electric power consumption on the service side and the estimate values of the second electric power consumption on the station side) is performed. The service pattern of the switching target may be the service patterns defined in advance in the service EMS 10 (for example, the service pattern P2 in FIG. 2) and may be the one that is generated based on the service patterns defined in advance (for example, the operation pattern P3 generated based on the operation pattern P2 in FIG. 2). After such processing at Step S10 is performed, the sequence is returned to the above-described Step S6.

At the above-described Step S9, when it is determined that it is not possible to provide the minimum service when the service pattern is switched, the sequence is advanced to Step S1. At Step S11, the processing of notifying the electric power company 50 that further power saving than the present situation is not performed, (that it is difficult to accept the electric-power regulation value) is performed, and the processing is finished.

As in the foregoing, in the present embodiment, for an example, the railroad EMS 30 is configured to control the service EMS 10 and the station EMS 22 such that the sum of the first electric power consumption consumed by the railroad vehicles 11 and the second electric power consumption consumed by the station facilities 21 will be equal to or less than a certain electric-power regulation value. Consequently, for an example, unlike the case in which the energy saving on the service side and the energy saving on the station side are manually performed separately from each other, the energy saving on the service side and the energy saving on the station side can be performed by the railroad EMS 30 automatically in a unified manner.

Furthermore, in the present embodiment, for an example, the service EMS 10 and the station EMS 22 are configured to be able to calculate the estimate value of the first electric power consumption and that of the second electric power consumption, respectively, and the railroad EMS 30 is configured to control the service EMS 10 and the station EMS 22 such that the sum of the estimate values of the first electric power consumption and the second electric power consumption will be equal to or less than the electric-power regulation value. Consequently, for an example, based on the estimate values calculated by the service EMS 10 and the station EMS 22, the energy saving on the service side and the station side can be performed quantitatively and accurately.

In the present embodiment, for an example, the service EMS 10 is configured to be able to achieve the power saving of the first electric power consumption by switching a plurality of service patterns (the service patterns P1 to P3 in the example illustrated in FIG. 2) concerning the service of the railroad vehicles 11, and the station EMS 22 is configured to be able to achieve the power saving of the second electric power consumption by switching a plurality of operation patterns (the operation patterns P11 to P13, P21 to P23, and P31 to P33 in the examples illustrated in FIGS. 3 to 6) concerning the operation of the station facilities 21. Here, the railroad EMS 30 is configured to determine the service pattern and the operation patterns with which the sum of the estimate values of the first electric power consumption and the second electric power consumption will be equal to or less than the electric-power regulation value, and operate the service EMS 10 and the station EMSs 22 with the determined service pattern and operation patterns, respectively. Consequently, for an example, by simply switching the service patterns and operation patterns, the energy saving on the service side and the station side can be performed easily.

In the present embodiment, for an example, the railroad EMS 30 is configured to select, in a state in which the operation patterns of the least second electric power consumption (the operation pattern P13 of the A station, the operation pattern P23 of the B station, and the operation pattern P33 of the C station in the examples illustrated in FIGS. 3 to 6) have been selected out of a plurality of operation patterns, a plurality of service patterns in sequence and compare the electric-power regulation value with the sum of the estimate values of the first electric power consumption and the second electric power consumption corresponding to the selected service patterns and the operation patterns, respectively. Consequently, for an example, because the energy saving on the service side is performed in a state that maximal energy saving has been performed on the station side, the energy saving of the entire system including the service side and the station side can be achieved while preferentially securing the electric power on the service side, which will give greater influence to the users through the energy saving.

In the present embodiment, for an example, the railroad EMS 30 is configured to select in sequence a plurality of service patterns in descending order of the first electric power consumption. Consequently, for an example, because the service pattern with which the sum of the estimate values of the first electric power consumption and the second electric power consumption will be equal to or less than the electric-power regulation value can be searched in sequence from the service patterns that enable high quality service to be provided (service patterns of greater first electric power consumption), degrading the quality of service due to performing the energy saving can be suppressed.

In the present embodiment, for an example, the railroad EMS 30 is configured to switch (alleviate) the operation pattern to the one that is of a greater second electric power consumption in a range for which the sum of the estimate values is equal to or less than the electric-power regulation value when the sum of the estimate values of the first electric power consumption and the second electric power consumption corresponding to the determined service pattern and operation patterns, respectively, is smaller than the electric-power regulation value by a certain value or more. Consequently, for an example, even when the energy saving on the service side and the station side is performed, the quality of service provided in the station facilities 21 can be improved in the range for which the sum of the estimate values is equal to or less than the electric-power regulation value.

In the present embodiment, for an example, the railroad EMS 30 is configured to switch (alleviate) the operation pattern to the one that is of greater second electric power consumption in sequence from the station facilities 21 of higher priority out of a plurality of station facilities 21. Consequently, for an example, the quality of service provided in the station facilities 21 of high priority can be improved.

While the present embodiment of the invention has been exemplified in the foregoing, the above-described embodiment is a mere example and is not intended to limit the scope of the invention. The foregoing embodiment can be implemented in various forms and various omissions, substitutions, and modifications can be made without departing from the scope of the invention. The foregoing embodiment and modifications thereof are included in the scope and spirit of the invention and are included in the scope of the invention stated in the claims and the scope of equivalents thereof.

The invention claimed is:

1. A railroad electric power management system comprising:
    a service management system that performs service management of railroad vehicles;
    a station management system that performs operation management of a station facility; and
    a control system that controls the service management system and the station management system such that a sum of first electric power consumption and second electric power consumption is to be equal to or less than a certain electric-power regulation value, the first electric power consumption being consumed by the railroad vehicles, the second electric power consumption being consumed by the station facility, wherein
    the service management system is configured to be able to change the first electric power consumption by switching a plurality of service patterns concerning service of the railroad vehicles,
    the station management system is configured to be able to change the second electric power consumption by switching a plurality of operation patterns concerning operation of the station facility,
    the control system is configured to determine the service pattern and the operation pattern with which the sum of the first electric power consumption and the second electric power consumption is equal to or less than the electric-power regulation value, and notify the service management system and the station management system of the determined service pattern and the determined operation pattern, and
    the control system is configured to select as priority an operation pattern of a least second electric power consumption out of the operation patterns, to select the service patterns in sequence in a state in which the operation pattern of the least second electric power consumption, and compare the electric-power regulation value with the sum corresponding to the selected service pattern and the operation pattern.

2. The railroad electric power management system of claim 1, wherein the control system is configured to select the service patterns in sequence in descending order of the first electric power consumption.

3. The railroad electric power management system of claim 1, wherein the control system is configured to switch the operation pattern to a first pattern when the sum corresponding to the determined service pattern and the determined operation pattern is smaller than the electric-power regulation value by a certain value or more, the first pattern being the operation pattern that is of greater second electric power consumption in a range for which the sum is equal to or less than the electric-power regulation value.

4. The railroad electric power management system of claim 3, wherein
    the station facility includes a plurality of station facilities, and
    the control system is configured to switch the operation pattern to a second pattern, the second pattern being the operation pattern that is of greater second electric power consumption in sequence from the station facilities of higher priority out of the station facilities.

* * * * *